Figure 5:
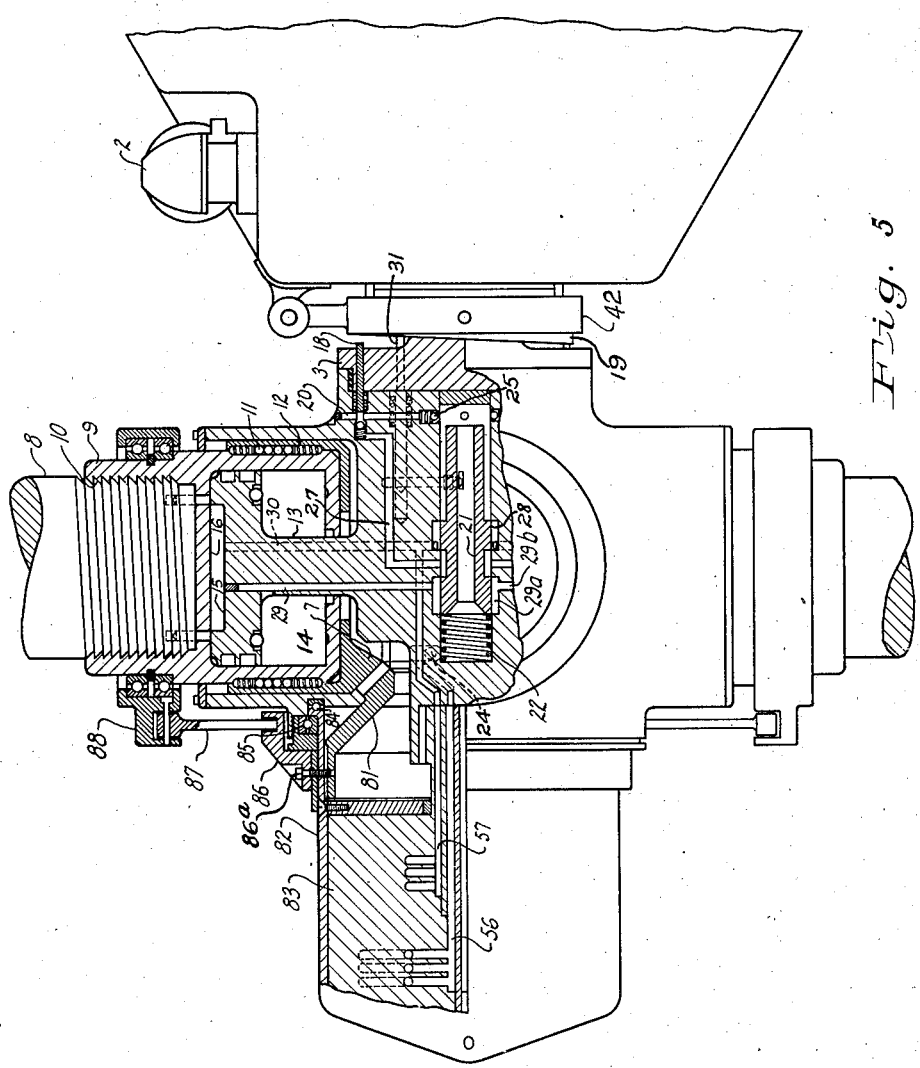

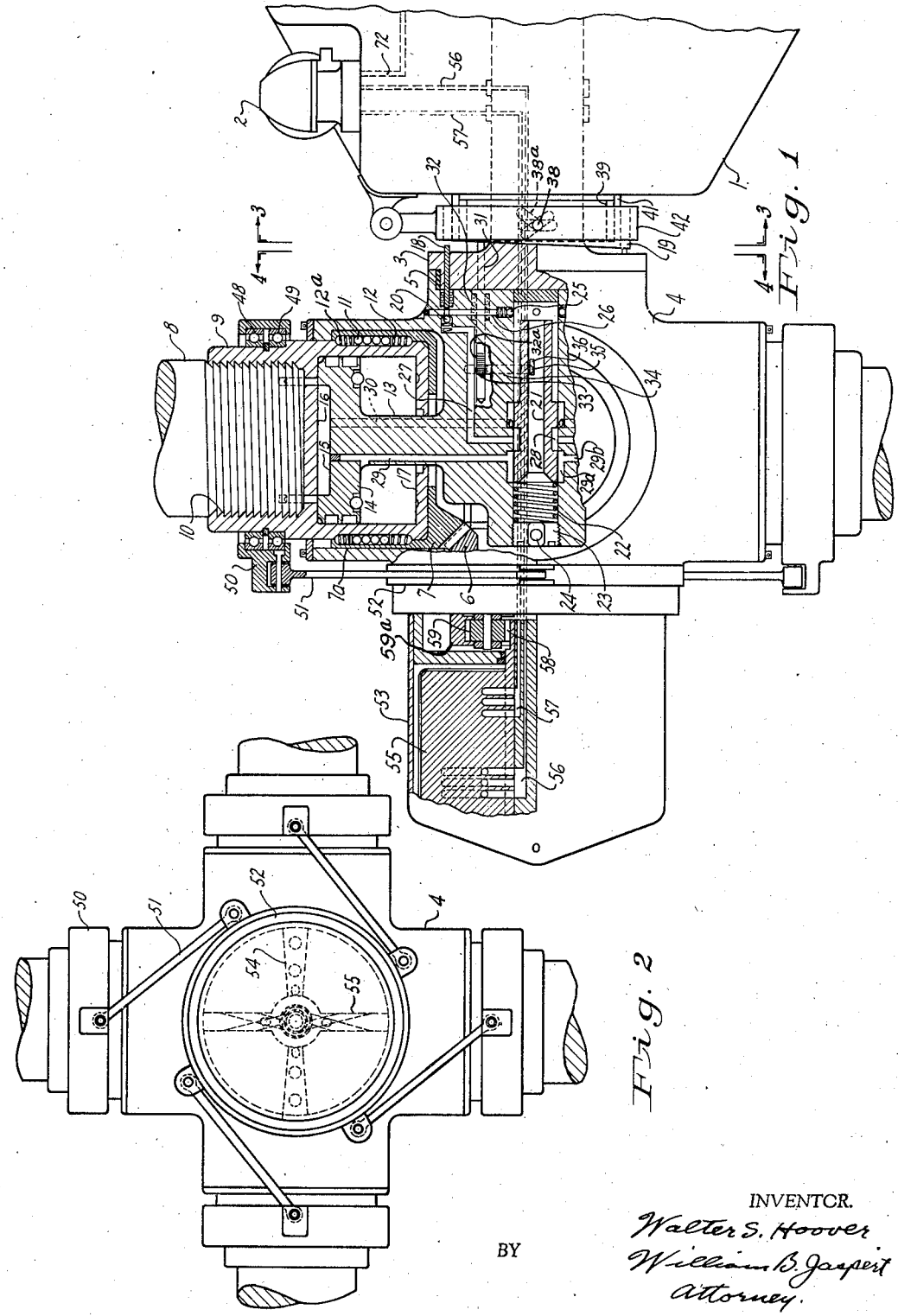

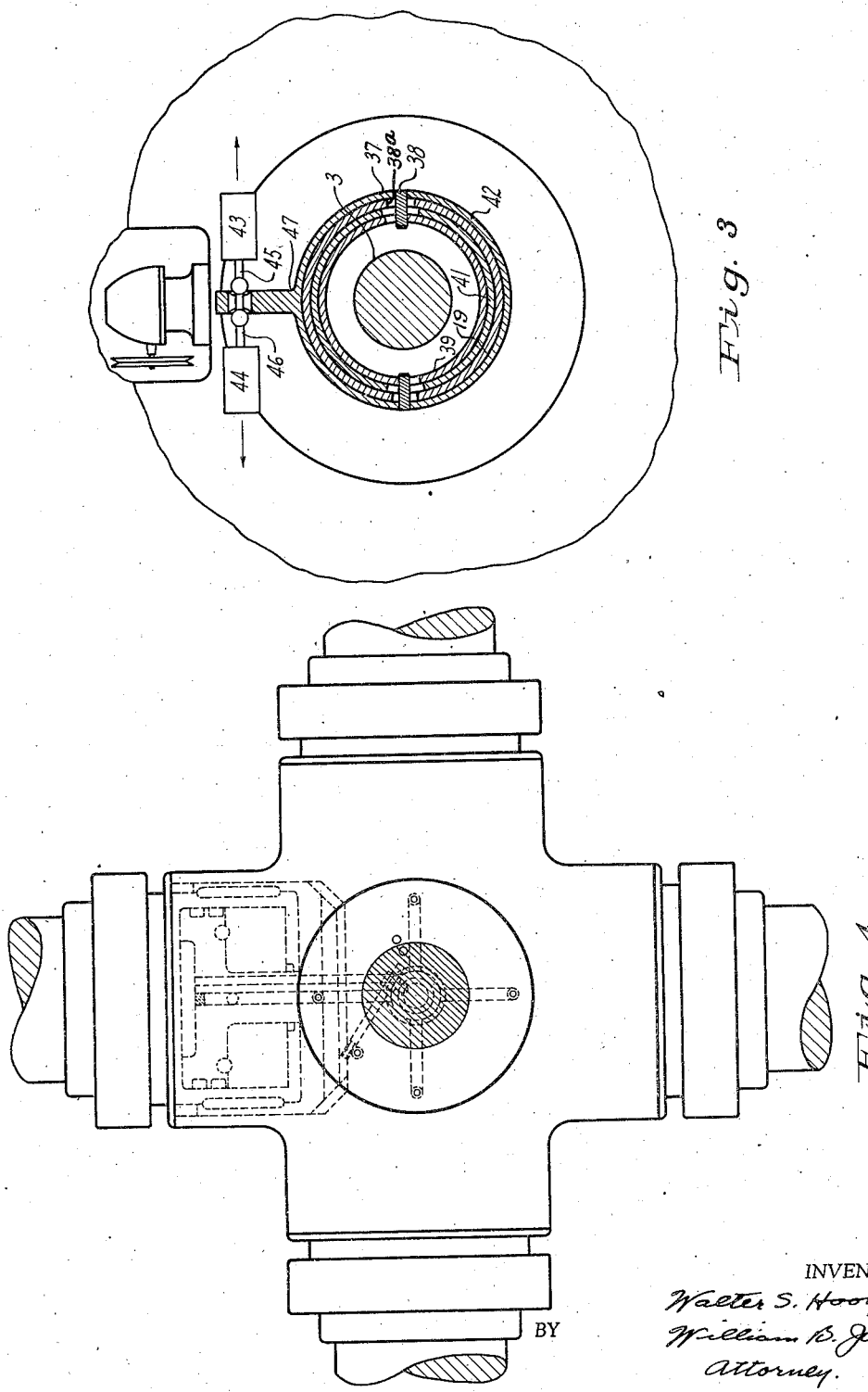

July 16, 1946.  W. S. HOOVER  2,404,290

VARIABLE DIAMETER AND VARIABLE PITCH PROPELLER

Filed March 14, 1941  6 Sheets-Sheet 4

INVENTOR.
Walter S. Hoover
William B. Jaspert
BY
Attorney.

July 16, 1946.　　　W. S. HOOVER　　　2,404,290
VARIABLE DIAMETER AND VARIABLE PITCH PROPELLER
Filed March 14, 1941　　　6 Sheets-Sheet 5

INVENTOR.
Walter S. Hoover
William B. Jaspert
BY

Patented July 16, 1946

2,404,290

UNITED STATES PATENT OFFICE 2,404,290

VARIABLE DIAMETER AND VARIABLE PITCH PROPELLER

Walter S. Hoover, Montreal, Quebec, Canada

Application March 14, 1941, Serial No. 383,389

13 Claims. (Cl. 170—160)

This invention relates to adjustable thrust propeller mechanism, and it is among the objects thereof to provide a variable diameter propeller whereby to vary the thrust area of the propeller blades, and it is a further object of the invention to provide, in combination with the variable diameter blades, means for adjusting the pitch setting of the blades. Still a further object of the invention is the provision of pitch adjusting means for variable diameter propellers with means for coordinating the pitch adjusting means and variable diameter adjusting means.

By the use of variable diameter propellers or variable pitch propellers, it is possible to obtain constant engine speed through flyweight governor control because in either case variations of the propeller thrust result in variations of the load on the motor.

If the engine speeds tend to increase above normal, increase in propeller thrust, by increasing the diameter or total thrust area, or by increasing the pitch setting of the blades, will maintain the engine speed constant.

Also, if in climbing or due to change in wind velocity the load on the engine increases tending to reduce the engine speed, a decrease of the propeller thrust area by reducing the diameter of the blades or by decreasing the pitch setting will maintain the speed of the motor constant.

Figure 6:
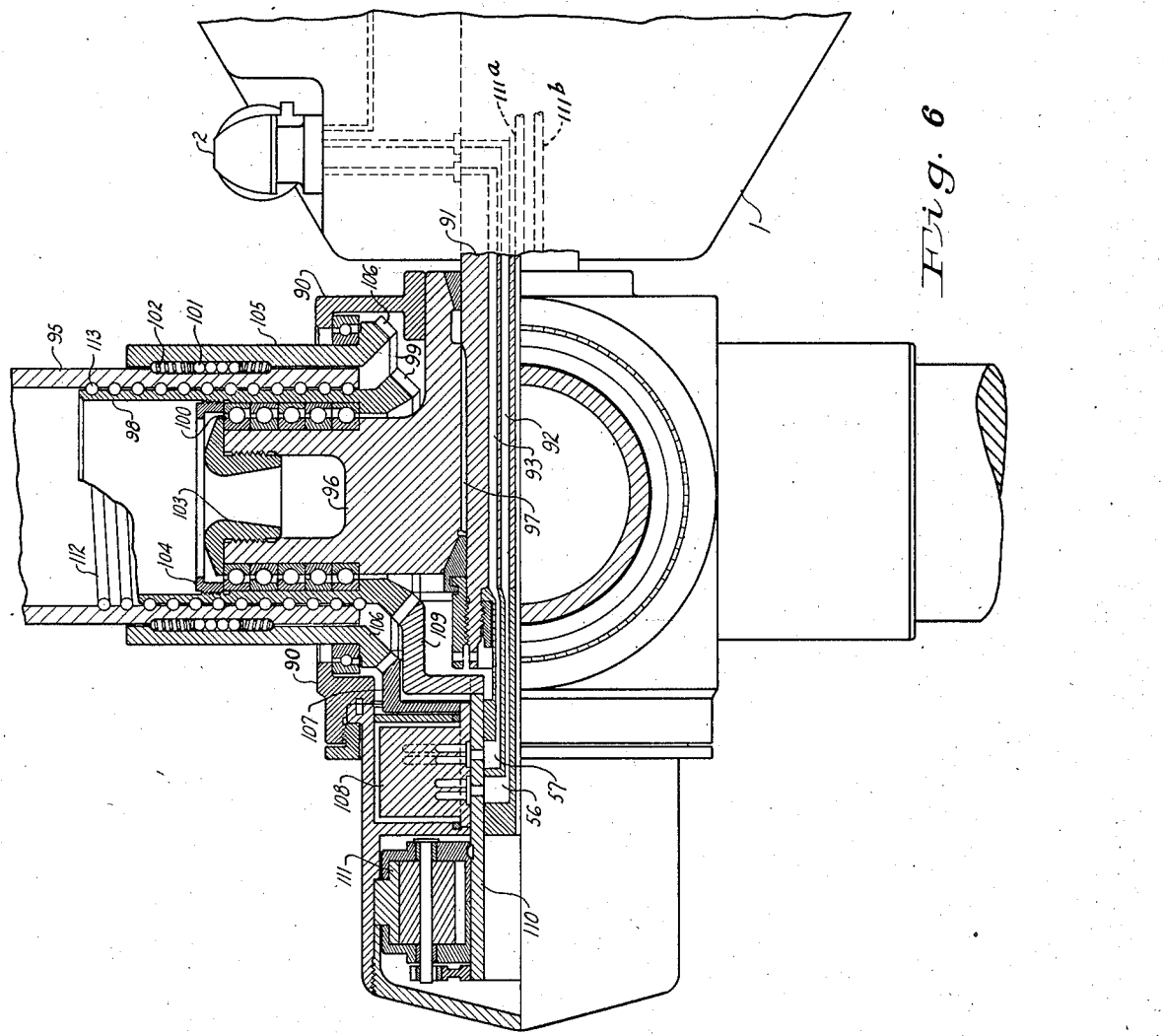
Figure 7:
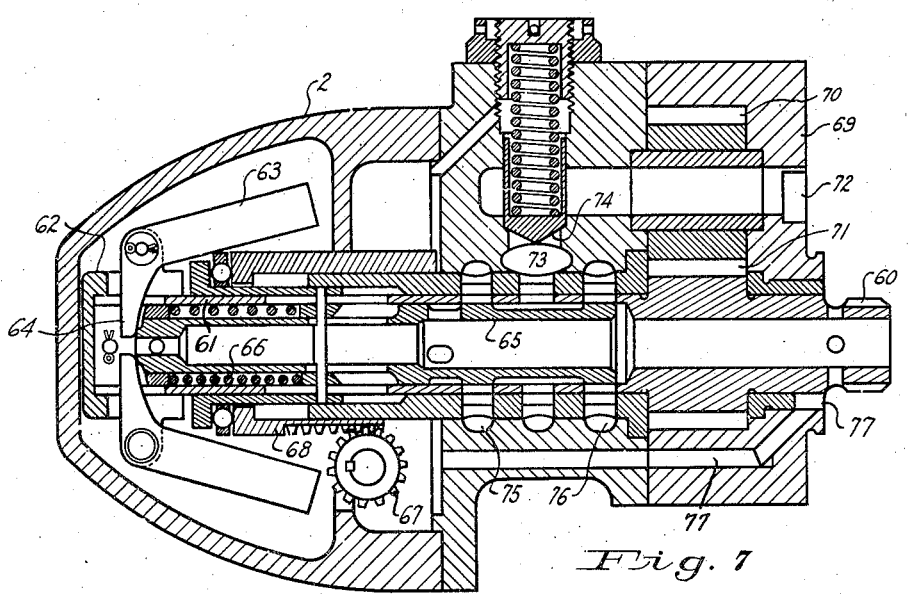
Figure 8:
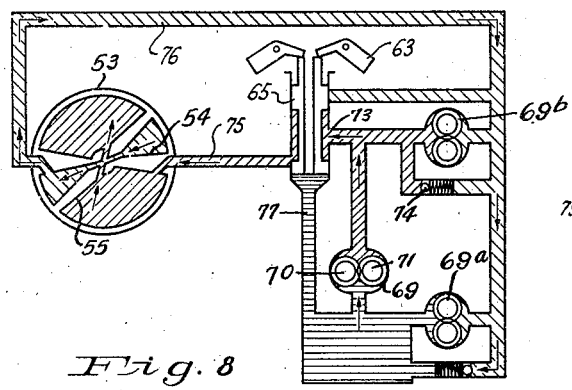
Figure 9:
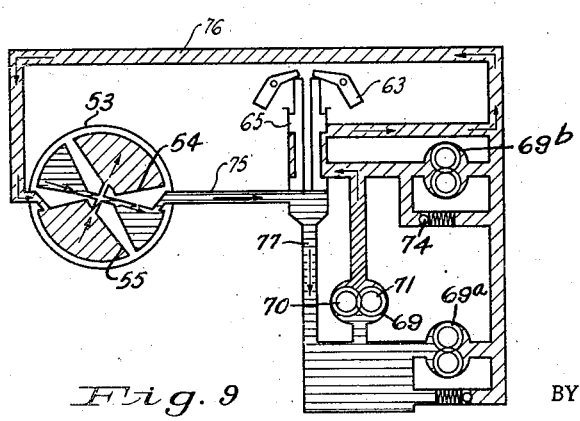
Figure 10:
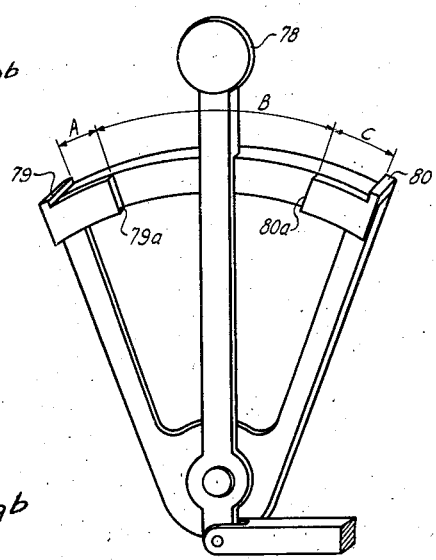

The present invention contemplates the use of either or both of these expedients for maintaining constant engine speed. The invention will become more apparent from a consideration of the accompanying drawings constituting a part hereof in which like reference characters designate like parts and in which:

Fig. 1 is a view partially in section and partially in side elevation of a variable diameter propeller unit with means for varying the pitch setting of the propeller blades;

Fig. 2 a front elevational view thereof;

Fig. 3 a cross-sectional view taken along the line 3—3, Fig. 1;

Fig. 4 a sectional view taken along the line 4—4, Fig. 1;

Fig. 5 a cross-sectional view partially in side elevation of the propeller unit shown in Fig. 1;

Fig. 6 a cross-sectional view partially in side elevation of a modified form of variable pitch propeller mechanism;

Fig. 7 a vertical cross-sectional view of a governor control unit;

Figs. 8 and 9 diagrammatic views illustrating the application of fluid pressure to the hydraulic actuator;

Fig. 10 a view in perspective of a manual control lever; and

Figure 11:
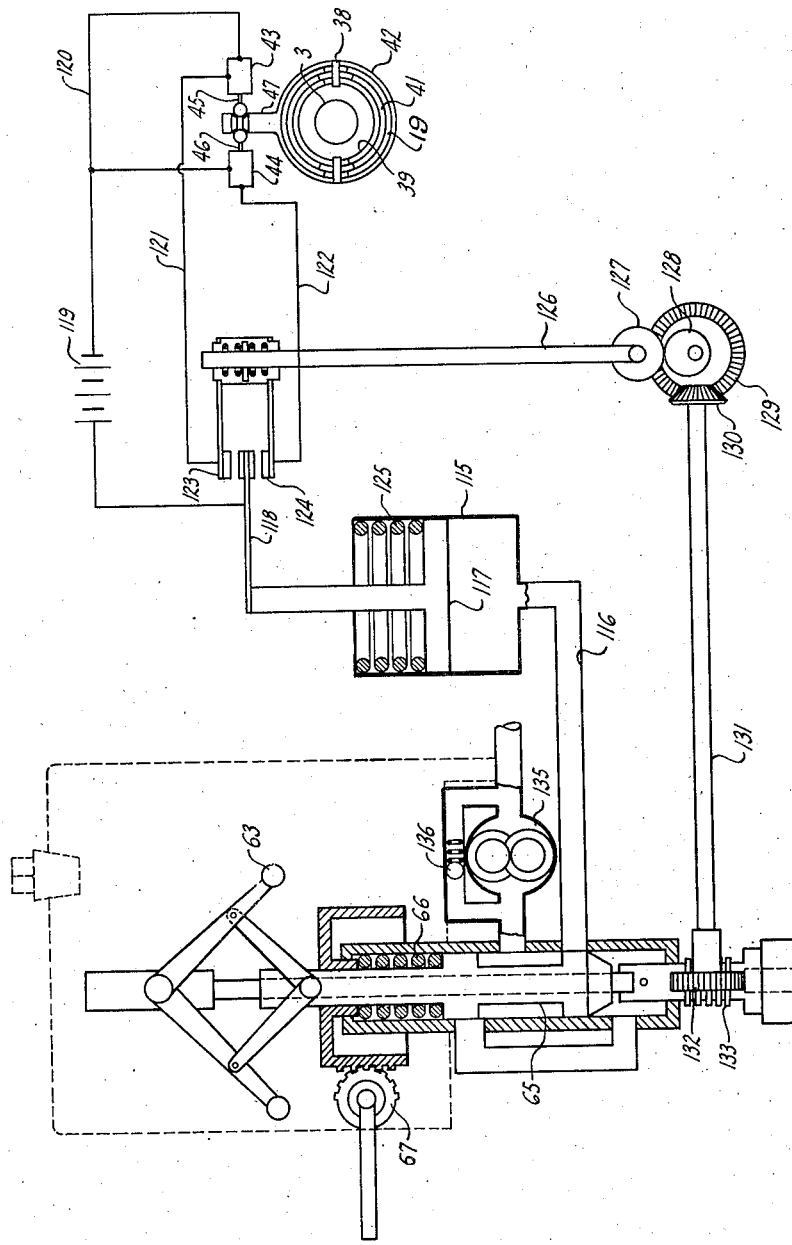

Fig. 11 a diagrammatic view of a governor valve controlled servo mechanism.

With reference to Fig. 1 of the drawings, the structure therein illustrated comprises the front or nose end of the engine designated by the reference numeral 1 having a governor unit 2 responsive to the speed of the motor mounted thereon, the crank shaft 3 of the engine terminating in a flange to which is connected the propeller hub unit generally designated by the reference character 4. The hub unit is mounted for self-centering on a rubber ring 5 and is attached to the engine shaft 3 by suitable bolts, not shown.

The pitch setting of the blades is effected through a master gear 6 that interacts with the teeth of the end gear 7 which carries the blade retainer. The blade roots 8 are mounted in the blade retainer 9 by engagement of their buttress threads 10, and the blade retainer is movable about its own axis by interlocking engagement of ball bearings 11 which are disposed in angularly spaced vertical slots 12, of which there are 6 around the blade retainer 9 and in the complementary slots of the blade end gear sleeve 7a. The ball bearings are yieldingly mounted in slots 12 by springs 12a. Variation in diameter is permitted by the inward and outward motion of the blade retainer 9 in the blade gear sleeve 7a aided by the bearing surfaces of the ball bearings 11.

The propeller hub 4 is provided with radially extending arms 13 having a piston 14 on the extended ends thereof, the piston being counterbored at 15 to form an oil chamber with the transverse wall 16 of the blade retainer 9, the piston 14 being spaced from the base 17 of the blade retainer 9 to form a fluid chamber. By the routing of fluid under pressure into the fluid chambers above or below the piston 14, the blade retainers 9 are subjected to radial displacement to vary the diameter of the propeller blades.

The pressure of the actuating fluid is boosted by small plunger pumps 18 which are actuated by a cam 19 which will be hereinafter explained in greater detail.

A check valve 20 permits the oil to flow into the blade displacement system but prevents its return, thereby maintaining the pressure. The routing of the oil from the booster pumps 18 is controlled by a sleeve or spool valve 21, the position of which is determined by the pilot setting the controls so that the cam that actuates the valve 21 is in proper position. This will also be hereinafter described in greater detail.

Valve 21 is held against the cam by coil spring 22, preloaded by the nut 23, which is designed with a two-way check valve 24 that serves to replenish the oil system, the oil entering the pump system by valve 25 and duct 26. The fluid under pressure is delivered through duct 27 to the spool valve chamber 28, from which it is routed through either the duct 29 to the chamber beneath the piston or the duct 30 shown in dotted lines leading to the fluid chamber above the piston. A control rod 31 for the valve 21 is biased by a coil spring 32 against the face of a cam 39 and is provided with a series of threads 32a which engage the gear teeth 33 on the lug rod 34. The lug 35 of rod 34 engages the sleeve valve 21 by the slot 36. The cam arrangement is shown in cross-section in Fig. 3 of the drawings in which the outer casing 37 is provided with two pins 38 which are slidable in the slots of a stationary ring 41 and engage the slots of the cams 19 and 39.

The entire assembly is held in place by a ring 41 which is a part of the nose of the engine, the motor shaft 3 being shown in cross-section. The outside casing 42 (Fig. 3) which actuates cams 19 and 39 is controlled by solenoids 43 and 44 which may be energized by a remote control such as a switch (not shown) in the pilot's cabin. The movable armatures 45 and 46 of the solenoids engage the arm 47 of the cam housing 42.

Since each of the blades is provided with a piston 14, their movements must be coordinated. Bearings 48 and 49, Fig. 1, and their casing 50 allow the blades to move about their own axes. Each blade is equipped with a connecting rod 51 attached to a coordinating ring 52. Consequently, any motion of one blade is duplicated in all of the blades to maintain concentricity of the propeller about the axis of rotation.

The operation of the mechanism for adjusting the diameter of the blades will now be described.

Starting with the minimum diameter of blade, as shown in Fig. 1, when the pilot reaches an altitude where an increased blade diameter is beneficial, or in other words, where it is desired to increase the area of the thrust of the propeller, he adjusts his control in the cabin to energize solenoid 44 which moves arm 47 of the cam toward the left, as indicated by the arrow in Fig. 3. This causes cam 39 to displace the control rod 31, which through its engagement with the lug rod 34 causes lug 35 to displace valve 21. Cam 19, which is a bevel cam, is subject to axial movement by engagement of its inclined slot 38a with pins 38 to contact the pump plunger 18. Oil at high pressure is forced through the valve 20 and through duct 27 into the annular duct 28. From this duct it is distributed through duct 30 to the upper piston chamber, and the fluid pressure exerted forces the blade retainer 10 radially outward carrying the blades with it, thereby increasing the diameter of the blades.

Oil in the fluid chamber below the piston drains out through duct 29 and annular chamber 29a to the reservoir through drain 29b.

When decreased blade diameter is desired, solenoid 44 is energized to move arm 47 to the right in the direction of the arrow. The pump cam 19 is thereby moved through neutral and into contact with the pumps 18. Valve 39 is forced forward causing valve 21 to move in the reverse direction. High pressure oil enters through ducts 27 and the annular duct 28 and then through duct 29 to the fluid chamber below the pistons, thereby forcing the blade retainer 10 radially inward to decrease the diameter of the blades. Fluid from the upper piston chamber is returned to drain through the duct 30.

The pitch setting mechanism will now be described.

The numeral 53 generally designates the hydraulic actuator which consists of stationary vanes 54 and movable vanes 55 that are angularly displaceable by fluid pressure routed through the governor valve 2 through passages 56 and 57, Fig. 1. The movable vanes 55 are provided with a ring gear 58 that actuates the master gear 6 through a planetary gear 59. The routing of the fluid to the hydraulic actuator will be described in connection with Figs. 7 to 9 of the drawings.

As shown in Figs. 1 and 7, the governor housing 2 is mounted on the nose of the engine and is provided with a spline connection 60 through which it is driven by the engine. The spline 60 is mounted on or integrally formed with a sleeve shaft 61 on which is mounted a hub cap 62 carrying flyweights 63. The flyweights are provided with lever arms 64 that engage the end of a sleeve valve 65 which is preloaded by a coil spring 66 to maintain a neutral position for normal operating speed of the engine.

The load of spring 66 may be adjusted by a selector mechanism 67 which engages the rack teeth of a sleeve 68 for compressing or extending the coil spring 66 as shown in Fig. 7.

Included with the governor housing 2 is a pump housing 69 containing pump gears 70 and 71 which deliver fluid from port 72 to a high pressure port 73. A check valve 74 maintains predetermined pressure of the fluid which is caused to recirculate if the valve is lifted by the fluid pressure. Valve passages 75 and 76 are connected to the hydraulic actuator, as shown diagrammatically in Figs. 8 and 9, and the pressure fluid from passage 73 is routed to the actuator in accordance with the movement of the governor valve 65 to either advance or retard the pitch setting.

Return fluid flows from passage 77 to the engine sump or to the storage space. The numeral 69a designates an engine driven pump for circulating lubricating fluid through the engine, the pump being connected on one side of the hydraulic actuator 53 to maintain a constant low pressure fluid on one side of the movable vanes 55 which is overcome by the pressure fluid of booster pump 69 to effect high pitch setting. A hydraulic motor driven pump 69b is connected to the governor valve passage 73 as shown and is electrically driven for feathering and unfeathering the blade if the engine driven pump 69 and 69a fail as when the engine stops. The electrically driven pump 69b is connected in an electrical power circuit having terminal contacts 79 and 80, Fig. 10, cooperating with control lever 78.

The governor valve 65 can be operated independently of the action of the flyweights 63 through the selector mechanism 67 which is actuated by a control lever 78, Fig. 10, operating between the stops 79, 79a, 80, 80a, the control range of lever 78 through the range designated B being the normal control range for constant speed, range A the feathering control range, and range C the unfeathering range.

In this manner the hydraulic actuator can be operated independently of the engine speed.

In Fig. 5, the design of the variable diameter mechanism and the pitch setting mechanism are modified to be coordinated by the governor valve mechanism 2 with electric contacts such as the contacts 123 and 124, Fig. 11 that energize the solenoids 43 and 44, to effect the proper setting of the cam mechanism. In Fig. 5 the end gears 7 of the blade ferrules coact with a master gear 81 that is locked to the actuator housing 82 which revolves with the rotor 83. The housing 82 is provided with an end bearing 84 in the hub housing and the ball race 85. The coordinating ring 86 is connected to the actuator housing 82 by bolts 86a and has arms 87 which engage the rings 88 of the blade retainers 9 to be actuated by rotation of housing 82 to coordinate radial movement of the blades in accordance with the movement of the hydraulic actuator 83.

The pressure fluid is self-contained in the space of the hub unit and is supplied through the valve passage 24 to the valve 21 from which it is delivered through the valve passage 25 to the booster pump 18. The high pressure fluid is then delivered through passage 27 to the high pressure port 28 of the valve 21 from which it is routed through glands 29 and 30 to the fluid chambers above or below the piston 14 as directed by the position of valve 21 by cam 39, Fig. 3. When the high pressure fluid is connected to the gland 30 for displacing the blade retainer 9 radially outward to increase the diameter of the propeller, it is simultaneously connected to the gland 56 of the pitch setting actuator to effect pitch adjustment of the blade, and when the valve 21 is moved to deliver the high pressure fluid through gland 29 to displace the blade retainer 9 radially inwardly, glands 30 and 56 are connected to drain and the hydraulic pitch adjusting mechanism is displaced to its normal position by the centrifugal thrust on the blade. In this manner both the propeller diameter and pitch adjustment are coordinated through the governor control valve 2, hereinafter described in connection with Fig. 11 of the drawings.

The design of Fig. 5 would be operative to simultaneously adjust the diameter and pitch of the propeller through the coordinating mechanism 87 and 88 connected to the bracket 86 which is rotatable with the hydraulic actuator irrespective of the manner of application of the pressure fluid. Thus, for example, if the fluid were applied only to the fluid chambers of the piston 14 radial movement of the blade retainer 9 would effect rotation of the pitch adjusting mechanism independently of any application of pressure fluid to the latter, and similarly if the pressure fluid were applied only to the pitch adjusting actuator to rotate its housing 82 the diameter of the propeller would simultaneously be adjusted through the coordinating linkage 87 independently of any pressure fluid application to the fluid chambers above or below the piston 14. However, by the application of the pressure fluid to both the diameter and pitch adjusting actuators a more efficient and balanced adjustment of these parts is obtained.

Still another modification of the design in which the variable diameter and pitch setting mechanisms are coordinated is shown in Fig. 6. The hydraulic propeller unit comprises a hub 90 that is mounted on an engine shaft 91 which has a two-way oil gland designated by numerals 92 and 93. The hub 90 is of the split design. The blade root is designated by the numeral 95. The spider 96 is splined on shaft 91 to rotate therewith as shown at 97. The outward and inward radial movement of the blade 95 is accomplished by rotation of the gear sleeve 98 which has an end gear 99, the sleeve gear 98 being mounted on a stack bearing 100. Rotation of the blade 95 on its own axis is prevented by an anti-friction spline consisting of balls 101 in slots 102, which are angularly disposed around the blade root 95. The stack bearings 100 are retained by nuts 103 and 104 in their proper position on the spider 96. The blade pitch is adjusted through the gear sleeve 105 having end gears 106 that interact with the teeth of the master gear 107 of the torque unit 108, which in turn is operated by the lubricating fluid of the engine as it is routed through the governor valve 2 to ducts 56 and 57.

The sleeve gear 98 is rotated by a gear 109 that is powered through a hollow sleeve 110 by a torque unit 111 which is actuated by the application of pressure fluid through glands 111a and 111b controlled by a manually operated valve (not shown).

The threads 112 of the blade retainer and of the sleeve gear 98 are ground to receive ball bearings 113 and the helix angle of the bearing threads 112 is such that the centrifugal force of the blades tends to turn the blades to high pitch, thereby balancing-out the centrifugal twisting moment, tending towards low pitch. This reduces the force required to change the blade angle.

It will be noted that by operation of the pitch setting actuator 108, the blade 95 is rotated for pitch setting as determined by the hydraulic governor valve 2, and by operation of the fluid pressure unit 111, gear 109 and gear sleeve 98 are rotated, which causes the blade 95 to move radially inward or out, as the case may be.

In Fig. 11, the governor valve 65 is shown coordinated with the solenoid-actuated cam mechanism of Fig. 3 through a servomotor 115. The servomotor consists of a cylinder connected by conduit 116 to the fluid pressure system of the governor valve 65 for the delivery of fluid under pressure to actuate piston 117 in response to variations in speed as effecting the operation of the flyweight 63 on the valve 65. Piston 117 actuates an electrical contact 118 connected to a source of electrical energy designated by the numeral 119.

The solenoids 43 and 44 of Fig. 3 are shown electrically connected in the circuit 120 and by conductors 121 and 122 to electrical contacts 123 and 124. If the piston 117 which is maintained in a neutral position by coil spring 125 effects contact of the terminal 118 with terminal 123, the solenoid 43 will be energized, and if terminal 118 contacts solenoid 124, solenoid 44 will be energized to control the cam mechanisms in response to the engine speed. To prevent abrupt adjustments by contact of the movable terminal 118 with the terminals 123 and 124, the latter are mounted on a reciprocating rod 126 having a roller 127 riding on cam 128. The cam is actuated by gear wheels 129 and 130, the latter being mounted on the end of a shaft 131 that is geared through a gear wheel 132 to a rack 133 attached to the governor valve.

If the governor valve 65 is subjected to fluctuations by movement of the governor weights 63 because of variations of the engine speed, the rod 126 will be similarly subjected to fluctuating movements with the result that contacts 123 and 124 will be subject to slight reciprocatory movement without necessarily engaging contact 118.

It requires but a very little movement of the valve to open the port to the fluid pressure line 116 of the servomotor so that fluctuating movements of the contacts 123 and 124 are not enough to prevent contact of the terminal 118 when the servo piston is subjected to the fluid pressure of the system.

The numeral 135 diagrammatically illustrates the source of pressure fluid such as a pump with a check valve 136, permitting recirculation of the fluid at predetermined pressures.

The mechanism shown in Fig. 11 coordinates the diameter increasing movement of the blades with the pitch adjusting actuator if it is desired to have both functioning simultaneously in response to speed variations of the engine.

It is evident from the foregoing description of the invention that the propeller thrust may be varied by either increasing the diameter of the blades or by adjusting the pitch setting or both. The advantages of this type of propeller appear to adapt it especially to motors of from 4,000 to 6,000 horsepower.

In the take-off the pilot will probably wish to independently control the diameter of the blades entirely separate from the constant speed control by contracting them to minimum diameter to deliver maximum horsepower. The blades may be set at their maximum diameter with a relatively flat pitch, and after levelling off they may be contracted for cruising only, on the constant speed pitch-setting unit, and perhaps after climbing to 30,000 feet it would again be desirable to use the maximum diameter blade, together with the constant speed pitch control, not advanced to its position for a maximum pitch angle.

In taking off to get the maximum horsepower, it would be desirable to take off load by drawing in the diameter of the blades, and on the take-off and climb the constant speed pitch-setting mechanism would permit the blades to deliver maximum horsepower. When at sea level at atmospheric pressure, the pitch of the propeller operating at constant speed would be rather flat with a minimum diameter blade, and as the higher levels of 10,000 to 20,000 feet are reached, the constant speed pitch would be nearing its maximum increased pitch setting. The pilot would then make use of a greater diameter blade. As the diameter is increased, the pitch control would flatten out again so that the useful range of pitch adjustment for constant speed would again be available.

It is evident from the foregoing description of the invention that various modifications may be made in the details of construction without departing from the principles herein set forth.

I claim:

1. In a propeller mechanism, a hub structure, a plurality of propeller blades mounted for radial and angular movement in said hub, an actuator for moving the blades radially of the hub to vary the propeller diameter, an actuator for subjecting the blades to angular movement about their longitudinal axis independently of said blade moving means, and control means for coordinating said actuators to be simultaneously operable.

2. In a variable thrust propeller mechanism, a hub structure, a plurality of propeller blades mounted for radial and angular movement in said hub structure, an actuator for varying the diameter of the propeller blades, a second actuator operable independently of said first-named actuator for varying the pitch of said blades, control means to selectively energize said actuators including means for coordinating the movements of said actuators in their thrust adjusting function.

3. In a variable thrust propeller mechanism, a hub structure, a plurality of propeller blades mounted for radial and angular movement in said hub structure, fluid pressure means for varying the diameter of the propeller blades, fluid pressure means for varying the pitch of the propeller blades, and means responsive to the propeller speed for simultaneously energizing the respective fluid pressure means.

4. In a variable thrust propeller mechanism, a hub structure, a plurality of propeller blades mounted for radial and angular movement in said hub structure, hydraulic actuating means for varying the pitch of the propeller blades, fluid pressure means for varying the diameter of the propeller blades, cam mechanism controlling the application of the respective fluid pressure means, a governor valve controlling the application of fluid to said hydraulic actuator, and means responsive to movement of the governor valve for controlling said cam mechanism.

5. In a variable diameter propeller unit, a hub having a plurality of radial arms with pistons at the ends thereof, blade retainer sleeves mounted for axial movement in said hub having cylinders for receiving the pistons of the hub, fluid pressure means including flow glands extending through said radial arms and pistons for actuating said cylinders, valve means controlling the application of said fluid pressure means above and below said piston to selectively displace the blade retainer sleeves relative to said pistons, and connecting rods secured to the blade retainer sleeve and to a coordinating ring whereby the movement of the blade retainer sleeves is coordinated.

6. A variable diameter propeller unit comprising a hub having radial arms with piston heads and having integrally formed sleeve portions coextensive with said arms, blade retainer sleeves disposed between said hub retaining sleeves and piston elements having cylinders coacting with the pistons of the hub, fluid pressure means including flow glands extending through said radial arms and pistons for actuating said cylinders, valve means directing the application of said fluid pressure means above or below the piston elements to correspondingly displace the blade retainer sleeves, cam mechanism controlling the movement of said valve and control means for actuating said cam mechanism.

7. A variable diameter propeller hub unit comprising a hub having radial arms terminating in piston heads and having integrally formed sleeves coextensive with said arms and piston heads, blade retainer sleeves disposed between said hub sleeve and pistons and having cylinders coacting with said hub pistons, fluid flow passages for directing fluid under pressure above and below said pistons, plunger pumps for delivering fluid under pressure, a valve controlling the direction of flow of the fluid above and below the pistons, cam mechanism for actuating said plunger pumps and valve, and control means for setting the cams in the path of movement of the pump plungers and valve actuating members, connecting rods for said blade retainer sleeves and a coordinating ring joined to said connecting rods whereby the movement of all of the blades is coordinated.

8. In combination, a variable diameter and variable pitch propeller mechanism comprising a hub structure having radial sleeves and radial arms with pistons disposed in said sleeves, blade retainer sleeves having cylinders coacting with said pistons, ferrules engaging said blade retainer sleeves having end gears, an actuator including a master gear coacting with the end gears to subject the blade retainer sleeves to angular movement, fluid pressure means including flow glands extending through said radial arms and pistons, a valve for directing fluid above and below the pistons to subject the blade retainer sleeves to movement radially of the hub, and control means for setting said valve to selectively increase or decrease the diameter of the blades.

9. In combination, a variable pitch and variable diameter propeller mechanism comprising a hub structure, piston elements mounted on said hub structure, blade retainer sleeves having cylinders coacting with said pistons, blade ferrules having end gears disposed around said blade retainer sleeves having angularly spaced slots in alignment with complementary slots of said blade retainer sleeve, ball bearings disposed in said slots to permit relatively axial movement of said blade retainer sleeves and ferrules, a master gear coacting with the end gears of said ferrules, a hydraulic actuator for said master gear, a governor control for energizing said hydraulic actuator in response to a variation in the engine speed to vary the pitch setting of the propeller blades, and fluid pressure means including a valve and cam control mechanism for directing fluid under pressure above or below the hub pistons to subject the blade retainer sleeves to radial movement relative to the hub.

10. In combination, a variable diameter and variable pitch propeller mechanism comprising a hub having a plurality of blade retainer sleeves mounted for radial movement therein, blade ferrules enveloping said blade retainer sleeves mounted to be rotatable therewith and fixed against radial movement, said ferrules having end gears, a master gear engaging said end gears, an actuator for said master gear, coordinating mechanism connecting said actuator and blade retainer sleeves, means for subjecting the blade retainer sleeves to radial movement and for simultaneously actuating the blade ferrules to subject the blade retainer sleeves to angular movement whereby to simultaneously adjust the blade diameter and pitch setting of the blades.

11. In combination, a variable diameter and variable pitch propeller mechanism comprising a hub structure including a spider, the arms of which are provided with stack bearings for journalling a gear sleeve having helical grooves on the outer periphery thereof, blade retainer sleeves having axially extending internal grooves disposed around said gear sleeve whereby upon rotation of the gear sleeve the blade retainer sleeves are subjected to axial movement, an external gear sleeve having angularly spaced slots in alignment with complementary slots of the blade retainer sleeve and having ball races disposed in said slots to permit relative axial movement of said blade retainer sleeve and gear sleeve, a hydraulic actuator having a master gear for engaging the teeth of said external gear sleeve and a hydraulic actuator having a master gear for engaging the teeth of said internal gear sleeve, and means for energizing said actuators whereby the blade retainer sleeves are subjected to angular movement to vary their pitch setting and to movement radially of the hub to vary the blade diameter.

12. In a variable thrust propeller mechanism, a hub structure, propeller blades mounted therein, pitch adjusting mechanism for said blades including an hydraulic actuator, fluid pressure means for changing the diameter of said blades, pump mechanism for delivering fluid under pressure to said diameter changing means, valve means controlling the flow of fluid pressure from said pump mechanism, cam mechanism for actuating said pump and valve, and governor control means operative in response to the speed of the propeller for controlling said cam mechanism to regulate the pitch adjusting mechanism and for routing pressure fluid to said hydraulic actuator.

13. In a variable thrust propeller mechanism, a hub structure having blades mounted therein, a hydraulic actuator for varying the thrust of said blades, pump mechanism and valve means for delivering fluid pressure to said actuator, said pump and valve mechanism being mounted in the hub, cam mechanism for actuating said pump in response to rotary movement of the hub, means for regulating said cam mechanism to regulate the pump and valve mechanism comprising solenoids for actuating said cam, an electrical power circuit for energizing said solenoids including a movable contact, a servo motor for operating said contact and a governor control mechanism for energizing said servo motor.

WALTER S. HOOVER.